(12) United States Patent  (10) Patent No.: US 9,116,891 B2
Waites  (45) Date of Patent: Aug. 25, 2015

(54) MEDIA CONTENT ROUTER

(75) Inventor: Nigel Waites, Lakeville, MN (US)

(73) Assignee: BBY Solutions, Inc., Richfield, MN (US)

( * ) Notice: Subject to any disclaimer, the term of this patent is extended or adjusted under 35 U.S.C. 154(b) by 1536 days.

(21) Appl. No.: 11/303,481

(22) Filed: Dec. 16, 2005

(65) Prior Publication Data

US 2007/0143377 A1  Jun. 21, 2007

(51) Int. Cl.
*G06F 17/30* (2006.01)
*H04L 29/08* (2006.01)

(52) U.S. Cl.
CPC .......... *G06F 17/30017* (2013.01); *H04L 67/06* (2013.01)

(58) Field of Classification Search
USPC .................................. 709/219, 249; 725/114
See application file for complete search history.

(56) References Cited

U.S. PATENT DOCUMENTS

| | | | |
|---|---|---|---|
| 6,996,720 B1 | 2/2006 | DeMello et al. | |
| 7,006,881 B1 | 2/2006 | Hoffberg et al. | |
| 7,529,263 B1 * | 5/2009 | Sparrell et al. | 370/437 |
| 2002/0188841 A1 * | 12/2002 | Jones et al. | 713/153 |
| 2003/0018702 A1 * | 1/2003 | Broughton et al. | 709/202 |
| 2003/0091026 A1 * | 5/2003 | Penfield et al. | 370/352 |
| 2003/0141093 A1 * | 7/2003 | Tirosh et al. | 174/72 A |
| 2003/0210666 A1 * | 11/2003 | Trossen et al. | 370/331 |
| 2005/0216949 A1 | 9/2005 | Candelora et al. | |
| 2006/0017968 A1 | 1/2006 | Usami | |
| 2006/0020589 A1 | 1/2006 | Wu et al. | |
| 2006/0036548 A1 | 2/2006 | Roever et al. | |
| 2006/0048196 A1 | 3/2006 | Yau | |

OTHER PUBLICATIONS

Digital Living Network Alliance, Overview and Vision, White Paper, Jun. 2004.
Digital Living Network Alliance, Use Case Scenarios, White Paper, Jun. 2004.

* cited by examiner

*Primary Examiner* — Ranodhi Serrao
(74) *Attorney, Agent, or Firm* — Beck Tysver Evans PLLC

(57) ABSTRACT

The present invention is a router with extended capabilities allowing it to make digital media content on a home local area network accessible over a wide area network such as the Internet, and a method for using such a media content router. The router can provide automated services for the local files such as photolab processing of digital images, or file backups. A pair of the routers can collaborate to play home media content at an away location when feasible, or transfer such files for away storage.

13 Claims, 6 Drawing Sheets

MEDIA CONTENT ROUTER

FIELD OF THE INVENTION

The present invention relates generally to wide area network (WAN) access for digital media content found in the home for services or remote presentation. More particularly, it relates to a router making home digital content files available over a WAN for remote processing or remote presentation.

BACKGROUND OF THE INVENTION

Households are accumulating a variety of digital electronics devices including computers, digital still and video cameras, televisions, compact disk (CD) players and recorders, digital video disk (DVD) players and recorders, personal digital assistant devices, and mobile phones. Files created by or stored upon these devices include images, audio recordings, and audio visual recordings in a variety of formats.

Efforts are underway to make digital electronics devices more interoperable and to allow sharing of files among them (e.g., Digital Living Network Alliance (DLNA), "Overview and Vision White Paper," Digital Living Network Alliance, 2004, which is incorporated herein by this reference in its entirety). For example, a CD stored on an audio system in one room might be played upon a second sound system in another room without the user having to physically extract the CD from the first system and insert it into a component of the second one. To conform to the DLNA interoperability standards, a device will be required to support at least a minimum set of canonical digital media file formats, and to convert any other formats into the canonical formats of the corresponding medium type. Adapters will be available to retrofit legacy devices to conform to the standards.

A central element of the resulting envisioned home media management system is a digital media adapter (DMA), an apparatus that provides a user interface into the digital media content. Presently, there are a wide assortment of DMA's—the consumer electronics vertical has not yet settled upon normative behavior for this class of devices. Generally, however, a DMA is a network device that allows a user to browse media content available on a home local area network from a monitor or television set, and to ask that specified content be presented (henceforth, to "present" digital content will mean to show, display, or play it, as the case may be) on a compatible device. The media content is stored in digital files that physically reside in a file server, such as a computer hard drive or a network-attached storage device. The digital media files are actually managed by a media content server, which is a computer equipped with media content management software that carries out requests from the DMA. In other words, the DMA is a thin client of the media content server, essentially a processor with a software stack, typically having no hard disk drive of its own. Presently, a DMA typically offers a graphical user interface (GUI) exclusively, but there is no reason why such a device could not be driven electronically by software commands.

A user might want to transfer digital media content outside the home for a variety of reasons. For example, photos might be transferred to a lab for printing. Today, the user must either manually port a storage device, such as a flash card or a CD, containing the image files to the photolab, or purchase software for her home computer to transfer the files across a wide area network (WAN) such as the Internet. Because of the aggregate size of the image files copied, currently the typical transfer time may be long, sometimes several hours. Even with a high bandwidth connection, upload speeds provided by Internet service providers are usually systematically significantly slower than those for downloads. During an upload, the user's computer responds sluggishly and certain tasks, such as rebooting to activate software updates, must be postponed to avoid aborting the image upload.

When someone's house is damaged or destroyed, they quickly realize that family photographs and home videos are irreplaceable. The risk of losing such files can be significantly reduced by routinely transfering them from the home to a remote site for backup. Obviously, many types of files other than media files, such as family financial records, ought to be backed up remotely as well. Performing such backups also requires specialty software, and like the software for remote photo-processing, an upload can significantly degrade home computer system usability when a large quantity of information is transferred.

Another digital media file transfer from the home occurs when a person plans to carry a CD containing music to his workplace, or a home video to the house of a friend. There are a number of disadvantages to this manual process. The item might be forgotten, simply left at home. The medium can get lost or damaged. CD's left at the office cannot be played at home, and conversely. It is impossible to keep such physical media well-organized and indexed, and at the same time available for immediate use at both home and away locations.

SUMMARY OF THE INVENTION

Although the DLNA and others are working to solve interoperability limitations of digital media devices on a home local area network (LAN), the present invention is motivated by the realization that interoperability of digital media devices over a WAN is today every bit as inconvenient. Any external service to be performed with home digital media content requires either task-specific software or manual transport of a storage device containing the digital content. Many tasks implemented in software relating to external services impose a significant performance impact, as well as other constraints, on a home computer system to the detriment of its users.

The central concept of the present invention is to enhance a router—conventionally, an apparatus that facilitates or manages a home LAN and allows it to be connected to a WAN—with the functionality of a DMA and have the resulting "media content router" make the link between the home digital media files and external services or external forums where the content can be presented.

Through such a media content router, access to a variety of external services for all types of home media content can be bundled into a single product and become available to the user. The media content router is smart enough to operate in background mode, with little noticeable impact on other devices connected to the local area network. The basic operations of a media content router are to (1) identify and initiate the transmission of files satisfying pre-specified criteria to a remote service facility; and (2) accept external requests for digital content (or for metadata about the digital content, such as a catalog or a list of items produced as the result of a search). The media content router might send a query or command to a media content server on the LAN to obtain the required information, or find the relevant files itself.

One external service of particular interest is processing the user's photographic images at a remote laboratory ("photolab"). This can be done by the media content router on an ongoing basis. Depending upon embodiment of the invention, the media content server or the media content router will identify newly acquired photos for printing. Also, depending on parameters specified by the user, approval might be required in some or all situations before the photos are sent off.

Backup of digital media files is a second task that can be performed by the media content router. This capability can be complementary to a photo processing service, or performed by an independent service provider. Obviously, this service offering can be logically extended within the scope of the present invention to backup of all files and filesystems, not only ones relating to digital media content.

Distant access by a user to her own home digital media content is another form of external service within the invention. For example, the user might want to play selections from her home music collection at the office of her small business, or a home video while visiting a family member. To accommodate this, a second media content router at the away site might work in collaboration with the one in the home. The away media content router can masquerade as, or serve as proxy for, network-attached storage containing media files on the LAN at the away site. It can also be enabled to act as a DMA there, enhanced with the capability to indicate whether presenting a file residing across the WAN in the home in near-real time is feasible. If transmission delay renders near-real time presentation impractical, or if the user so prefers, the media file can simply be transferred by the away media content router to a file server at the away site. In the process, the away media content router will be exercising the command-driven interface of its mate, the home media content router. The feasibility of presentation across the WAN turns on factors including the media type and format, the size of the file, the type of, and usage load on the home file server, the speed of the connection, whether the files are to be sent in encrypted or compressed form, and user preferences. Storage at the away site, when indicated, could be transient, retained only for the duration of the presentation itself, or be more permanent in nature.

A simple usage of this distant access capability would be to instruct the away media content router to maintain the media content stored at the user's workplace in synchronization with his home media content. Such synchronization would not impact the home system, even with a slow connection to the WAN, because it would take place during periods of network non-use.

Processing of home digital images at a remote facility, remote backup of home files (digital media or otherwise), and presentation of home digital media content at an away site are three examples of the kinds of services that a media content router can provide. Many others can easily be imagined by those skilled in the art that the present invention can perform. The media content router can be preconfigured with software and data (e.g., the network address of a photo processing facility) to execute these capabilities, or it can be configured after deployment with software.

Throughout this document, frequent use is made of the term "home" in connection with facilities, components, and users—e.g., "home media management system." While a home media management system might, in fact, be installed in an actual household, an installation in, say, a automobile repair shop could be a home media management system within the meaning of the term. In portions of the discussion involving a single media content router, external service facilities are described as "remote." When two media content routers are interacting with each other, one of these will be referred to as "home" and the other as "away" (or "office"). Again, the choice of these words of location is a simplification to enhance clarity, not a limitation on the scope or applicability of the present invention.

DETAILED DESCRIPTION OF THE INVENTION

Home Media Management System

Figure 1:
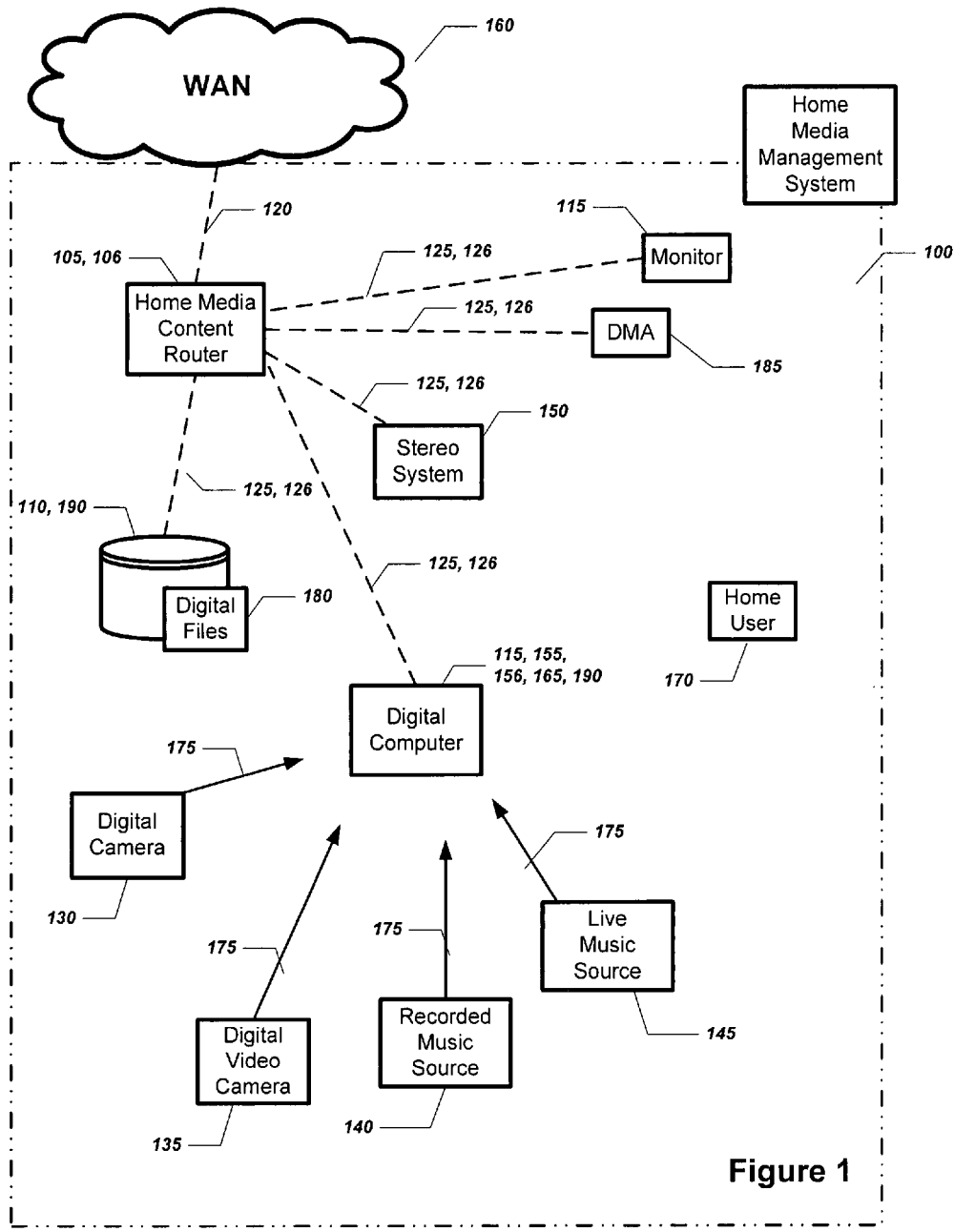
FIG. 1 is a diagram showing a home media management system configuration.

FIG. 1 illustrates a typical home media management system 100 employing a media content router 105 of the present invention. A media content router 105 always facilitates a LAN 125 as part of its conventional router functionality, and exploits the logic (i.e., implementation of an operation in digital hardware and/or software) of a media content server 155 for its extended, DMA-like, functionality.

Digital media content 175 generally falls into three categories: images (e.g., photos, drawings, and clip art); audio (e.g., music tracks and albums); and audio-visual (e.g., movies and home videos). By definition, all digital media content 175 can be represented in digital files 180. The minimum configuration for a home media management system 100 includes a home LAN 126, to which may be connected: a digital computer 165 acting as a home media content server 156, a file server 190 for digital files 180 containing digital media content 175, and a home media content router 106. The file server 190 can either be a digital computer 165 or network-attached storage 110. Multiple file servers 190 are possible, all having content visible to, and accessible through, the home media content server 156. A home media content router 106 has all the capabilities of a conventional router, serving as a hub for the home LAN 126 and also providing devices on the home LAN 126 with remote access to a WAN 160 such as the Internet. The home WAN connection 120 allows information, including files, to be transferred between the home media management system 100 and external sites.

For the user's enjoyment, a home media management system 100 will more typically include components in addition to those of the minimum configuration for the present invention. A variety of devices, such as a digital camera 130, a digital video camera 135, a recorded music source 140 (e.g., CD or DVD), or a live recording source 145, can all contain or create digital media content 175 files. Using standards, protocols, and interfaces such as those being developed by the DLNA, a stereo system 150 could be connected to the home LAN 126 and play any music tracks managed by the home media content server 156, regardless of which file server 190 within the home media management system 100 physically stores the tracks. A monitor 115 (which could be primarily employed as a computer screen or alternatively as a television set) could similarly display digital still phototographs and videos stored on any compatible device under home media content server 156 control.

A DMA 185 connected to the local area network 125 can provide the monitor with an interface through which the user can list or search all available digital media content 175 under control of the home media content server 156, and select particular digital media content 175 for presentation on designated appliances. The DMA 185 could be physically located in an independent device, or could be within a component of a digital computer 165 or the monitor 115.

Media Content Router

As described in the previous section, the role of the home media content router 106 was limited to providing conventional router functionality for the home media management system 100—wired and/or wireless LAN 125 connections and addressing, and access to a WAN 160. The essence of the present invention is to vest that router with additional functionality to (1) provide services relating to digital files 180, especially ones containing digital media content 175; and (2) to make digital media content 175 available for distant presentation or storage across a WAN 160.

The specific protocol by which, in practice, the remote access is achieved is not a distinguishing characteristic of the invention. The present invention, in other words, encompasses all such protocols. In this regard, the only requirement is that the media content router 105 and a remote device with which it is communicating share at least one common protocol. A number of protocols presently support such remote access, among others, including: Hypertext Transfer Protocol (HTTP) through a network browser (possibly with servlets or Java Server Pages); enterprise Java Beans; Common Object Request Broker Architecture (CORBA); remote method invocation (RMI); simple object access protocol (SOAP); and various forms of message-oriented middleware. A media content router 105 might be compatible with several of these protocols. In addition, a variety of security and compression technologies are available for each such remote access protocol.

Because a media content router 105 must provide an interface that facilitates listing, searching, and access to digital files 180 containing digital media content 175, it would (if augmented with graphical user interface logic) have the complete functionality of a conventional DMA 185. In a particularly simple embodiment of the invention, the separate digital media adapter 185 in the home media management system 100 of FIG. 1 can therefore be eliminated entirely. Like a conventional DMA 185, a media content router 105 always relies upon a media content server 155 to carry out the details required to read, write, and manage storage and retrieval of files.

Figure 2:
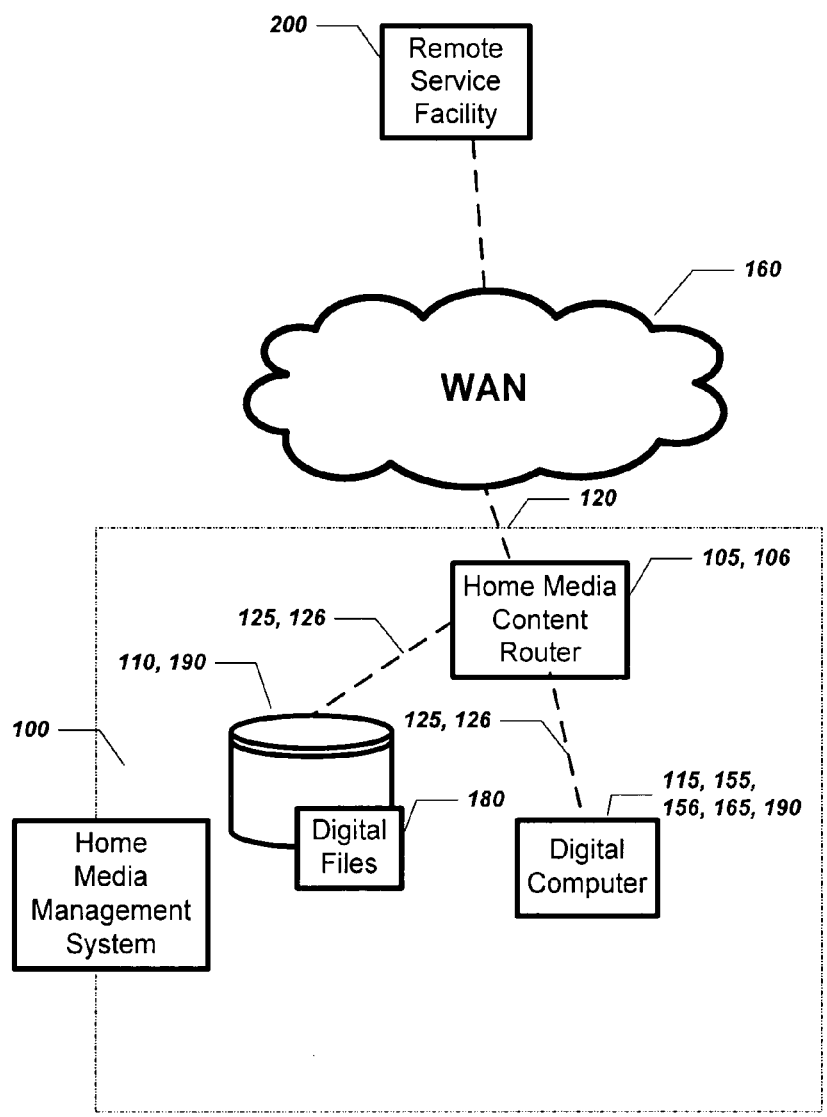
FIG. 2 is a diagram showing a configuration whereby a remote image processing laboratory can connect to a home media management system through a media content router.

A second embodiment of the present invention is shown in FIG. 2 utilizing a basic configuration adequate for useful external interaction of the media content router 105 with the outside world. The separate network-attached storage 110 device shown is actually not essential if the home media content server 156 or other digital computer 165 satisfies the need for a file server 190. The home media content router 106 finds relevant digital media content 175 on the home media management system 100 and transfers the associated digital files 180 to (and possibly from) a remote service facility 200 for some kind of processing. The terms and options of the processing characteristically derive from an agreement between the user and the remote service facility 200.

The preferred embodiment is a system and method based on the special case of that embodiment illustrated by FIG. 2 in which the remote service facility 200 is a photographic laboratory ("photolab") that prints selected digital images. The home media content server 156 recognizes when a digital file 180 containing an image has been placed within a previously designated directory or folder on a file server 190. There can be one or more such designated folders on one or more file servers 190. A designated folder can be a single level in a directory hierarchy, or an entire structure of subdirectories at and below a certain level in a directory tree structure. When an image file 180 is recognized, the home media content server 156 notifies the home media content router 106. The home media content router 106 uploads image files 180 so identified to the photolab during intervals when communication bandwidth is available, thereby executing the upload without impact perceptible to the home user 170 on the home media management system 100. Depending upon the prior contractual arrangements, the images might be printed immediately, or the home user 170 might be given the opportunity to select which ones to print, possibly by interacting with the photolab through a browser. Also depending upon prior contractual arrangements, any uploaded images might be coincidentally backed up to some form of digital storage by the photolab.

Rather than automatically designate for upload all new digital files 180 containing images immediately upon placement by the home user 170 into a particular set of folders, a scheduler can trigger an inventory of the contents of file servers 190 on the home media management system 100 to identify those due for processing by a remote service facility 200 (photolab or otherwise). The scheduler might be physically contained or implemented within the home media content router 106, but not necessarily. Once triggered, the home media content router 106 can carry out the upload either on a bandwidth-available basis or with a higher priority.

In a variant of the illustration of FIG. 2, the remote service facility 200 performs backups of some subset of the user's digital files 180, not necessarily just those containing digital media content 175, possibly all the file types existing in file servers 190 connected to the home local area network 126. The ability to restore designated digital files 180 from the remote backup site might be provided by a download through a browser, or by the home media content router 106 itself.

Figure 3:
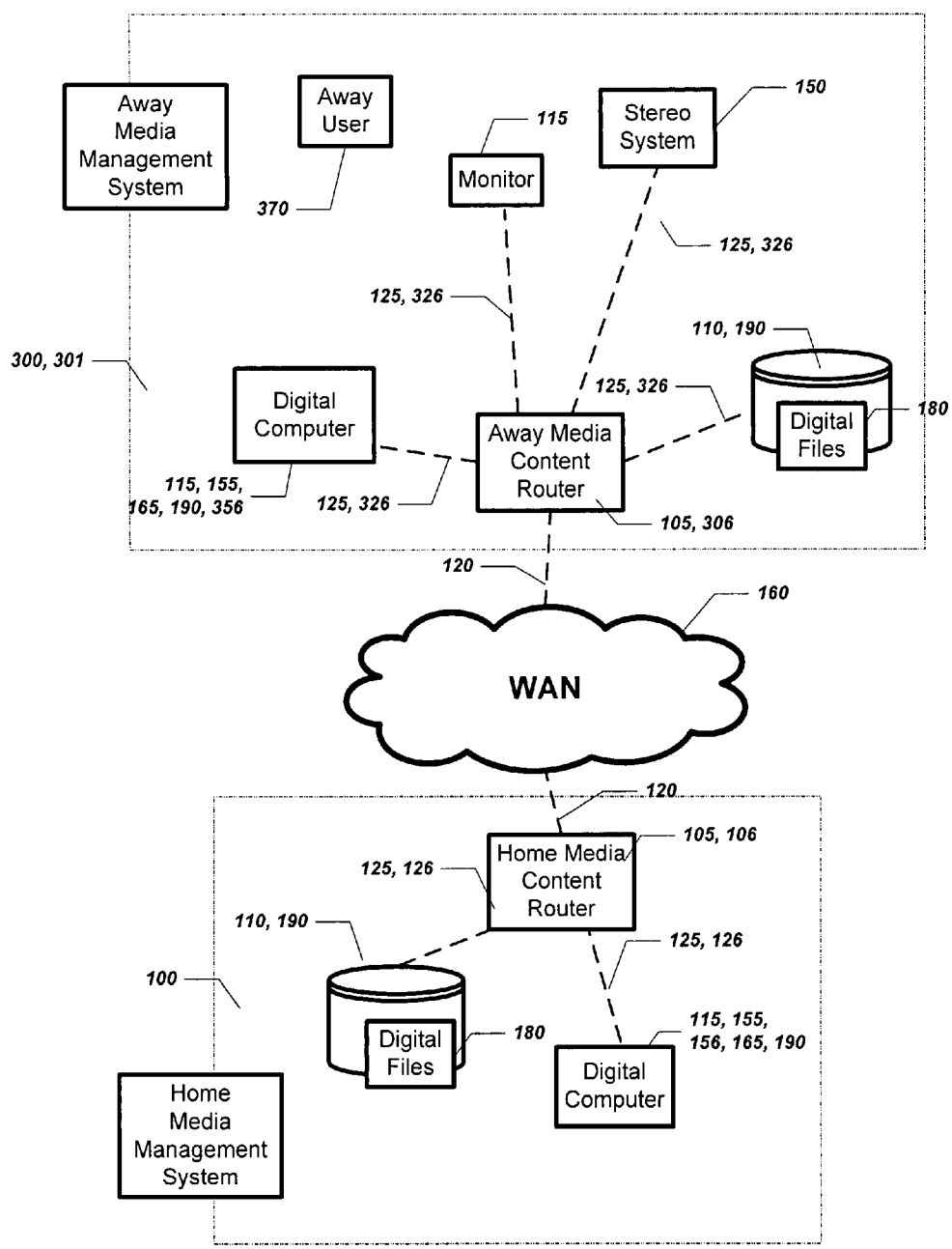
FIG. 3 is a diagram showing a configuration whereby an away site can access and present digital media content from a home media management system using a pair of media content routers.

FIG. 3 shows two media content routers 105 collaborating to serve up home digital media content 175 to the user when she is at some location away from the home. The figure suggests an away site 300 that happens to be an office workplace, but away display capability might be invoked anywhere; another example of an away site 300 is the home of a friend or family member. Similarly, as mentioned previously, the "home" site need not bear any resemblance to a household. In any case, the away user 370 might want to display digital media content 175 from the home, or transfer digital files 180 for storage at the away site 300.

It is worth noting in FIG. 3 that the away media content router 306 will be acting in a very different role from the home media content router 106 because it (1) has DMA 185 logic for serving up home information and content to the away media management system 301 across the WAN 160 and (2) relies upon a second media content router 105 (namely, the home media content router 106) to fulfill its role. The away media content router 306 can be configured in two ways. In the first alternative, the away media content router 306 will appear to devices on the away LAN 326 primarily as network-attached storage 110 transparently presenting home digital media content 175 on away devices. The home media content router 106 will be responding to commands from the away media content router 306, such as commands to list or search contents, or to cause transmission or streaming of a digital file 180 containing digital media content 175. Typically, the away media content router 306 will specify to the home media content router 106 the away server and directory location to send the files, but will not actually write the files to the remote server itself.

Alternatively, the away media content router 306 can be configured to serve as the DMA 185 at the away site 300. In this case (which is an extension of the embodiment discussed previously in which the home media content router 106 was used to eliminate the home DMA 185), the away media content router 306 would not be emulating network-attached storage 110 containing digital media content 175. Instead it would be directing requests, made by the away user 370 to search or present digital media content 175, to both the away media content server 356 and the home media content router 106. In fact, FIG. 3 omits a separate DMA 185 in the office in recognition of the option to have the away media content router 306 subsume the functionality of an away DMA 185.

One aspect of the embodiment illustrated in FIG. 3 might be continuous synchronization of digital media content 175 between the home LAN 126 and the away LAN 326. The synchronization can be unidirectional (i.e., all new digital files 180 containing digital media content 175 on the home media management system 100 are sent to the away site 300) or bidirectional. As in the photolab example, certain folders or folder hierarchies can be monitored on an ongoing basis by the home media content server 156, which would then notify the home media content router 106 of the existence of new digital files 180. The home media content router 106 and the away media content router 306 would negotiate to ensure that bandwidth is available at both ends of the WAN connection, and that the transfer can be done without impacting activity on either the home LAN 126 or the away LAN 326.

So far, several embodiments of the present invention have been distinguished by the functionality which the media content router 105 delivers beyond that of a conventional router. To recapitulate, some such different types of enhanced functionality are: (1) standard home DMA 185 functionality; (2) transferring selected digital files 180 to a remote facility for processing; (3) transferring files (not necessarily just digital media content 175 files) to/from a remote facility for backup/restoration; (4) responding to commands from an away device to transfer digital files 180 and metadata regarding such content; (5) emulating a file server 190 on an away LAN 326 and forwarding requests to the home media content server 156 for execution; (6) serving as a DMA 185 for an away LAN 326 while also providing access to digital files 180 from the home media management system 100; and (7) conducting file transfers with various levels of priority, most notably in deep background mode. Of course, numerous media content router 105 embodiments can be defined by mixing and matching these capabilities. An embodiment that would be attractive to users is a media content router 105 that blends all of these types of functionality.

Remote Service Facility Workflow

Figure 4:
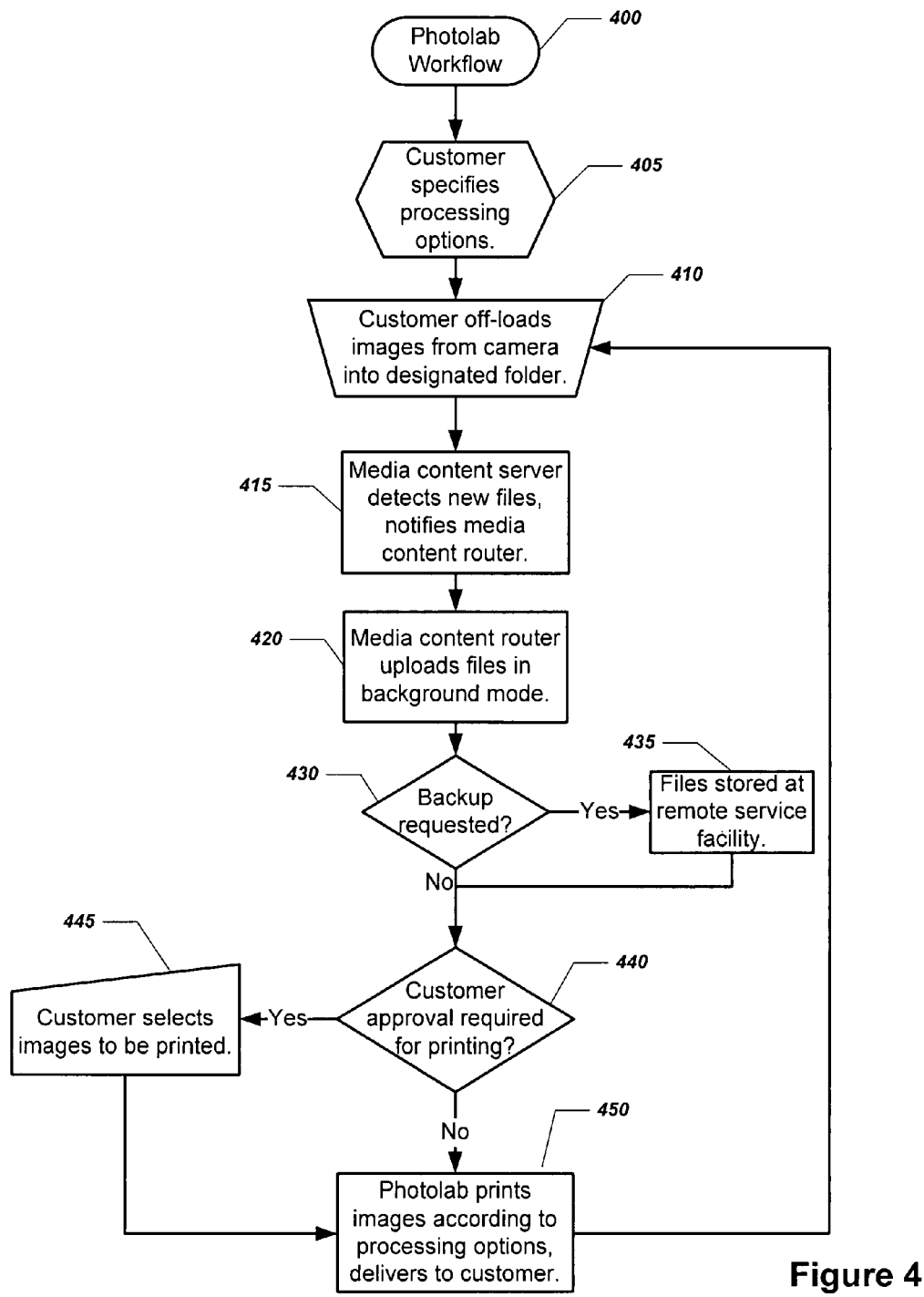
FIG. 4 is a flowchart showing a workflow for remote processing of home digital media content.

FIG. 4 illustrates a typical workflow 400 corresponding to FIG. 2, the configuration where a media content router 105 is being used for remote processing of digital files 180 from the home media management system 100. A photolab, capable of printing user digital photos onto paper, will be used as an exemplary case, but any other kind of remote processing of digital content from the home is within the scope of the invention. Typically but not necessarily, the available products/services and terms of the remote processing will be based on a contract between the user and the remote service facility 200. Under a contract with a photolab, in particular, the user may have some flexibility with respect to which photos are printed, how often they are printed, the size and quality of the printed images, the speed with which the prints need to be printed, and so forth. As part of the setup of the media content router 105, these customer preferences, as well as contractual pricing and quality of service terms, are specified in advance 405. As convenient or appropriate, processing options might be stored digitally or otherwise retained at the home or at the photolab, or both.

When the customer off-loads 410 a set of images from a digital camera, the new files are detected. Depending on the embodiment of the present invention, either the home media content server 156 detects the files and notifies the home media content router 106, or the home media content router 106 detects them itself. The home media content router 106 begins to upload 420 the files immediately, but only when and while communication bandwidth is free from other activities. If the customer processing options request 430 file backup (and if that service is available from the photolab), the files are stored 435 at the remote service facility 200. If customer approval is required 440 before printing, then the customer selects 445 which images should be printed. Finally, the photolab prints the images and delivers 450 them to the customer.

The present invention media content router 105 plays a significant role in this process by relieving the customer from most of the tedious effort to get photos printed. As an alternative to placing image files 180 in a particular folder, the home media content server 156 or the home media content router 106, depending upon embodiment of the present invention, can be configured to find relevant file types in any file server 190 in the home media management system 100. This way, the user has the convenience of organizing the images in any way and storing them anywhere on the home media management system 100. The transfer process can be done in background mode, possibly overnight, so as not to significantly impact processing on any home LAN 126 devices or the quality of WAN and LAN communications. The automatic upload arrangement is also advantageous to the remote service facility 200, since once a customer has purchased a router with scheduled file processing built-in, they are likely to continue the service.

File Backup Workflow

In the workflow 400 shown in FIG. 4 just described, uploads for file backup are triggered instantaneously when an image file 180 is placed into a designated folder, but the upload itself takes place in deep background mode. In that workflow, the backup was incidental to the photo processing, but obviously an even simpler workflow (not shown) within the scope of the present invention deals solely with file backup, again triggered immediately whenever an existing file were modified or a new file were to appear on the LAN 125.

Figure 5:
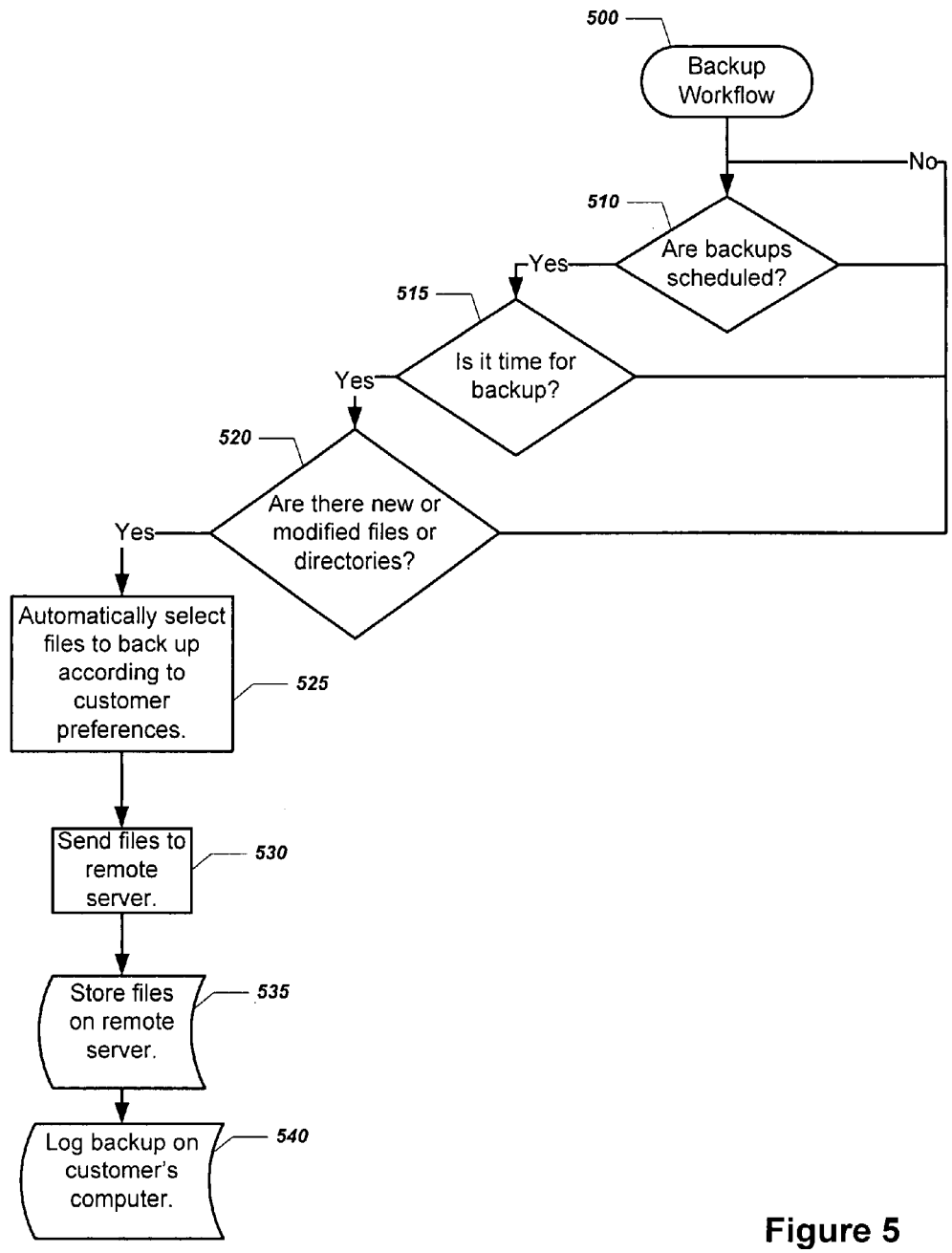
FIG. 5 is a flowchart showing a workflow for remote backup of home digital media content.

For contrast, FIG. 5 depicts a workflow 500 using the home media content router 106 for remote file backup, taking an alternative triggering approach. In this case, backup is triggered 515 on a regular basis by a scheduler rather than immediately. The scheduler can be built into the home media content router 106, incorporated into another component, or separate. The scheduler can be implemented as hardware or software, or some combination thereof. Note that whether the task of uploading 530 the files is done in foreground or background mode is a separate choice and aspect from how the upload is triggered, whether immediately or periodically by a scheduler.

If 510 backups are scheduled, and if 515 it is time for a backup, and if 520 there are files that need to be backed up, then the files are automatically selected 525 according to customer preferences. The files are sent 530 and stored 535. A log record of the backup is made 540.

Obviously, for the backup workflow to be useful, there has to be a matching workflow whereby the user can specify files to be restored that might have gotten lost or destroyed. Although restoration may be incorporated into the functionality of the home media content router 106, it is more likely to be handled as a web service invoked by the user from a browser on a local computer, such as the home media content server 156, through the web site of the backup service provider.

Remote Digital Media Presentation Workflow

Figure 6:
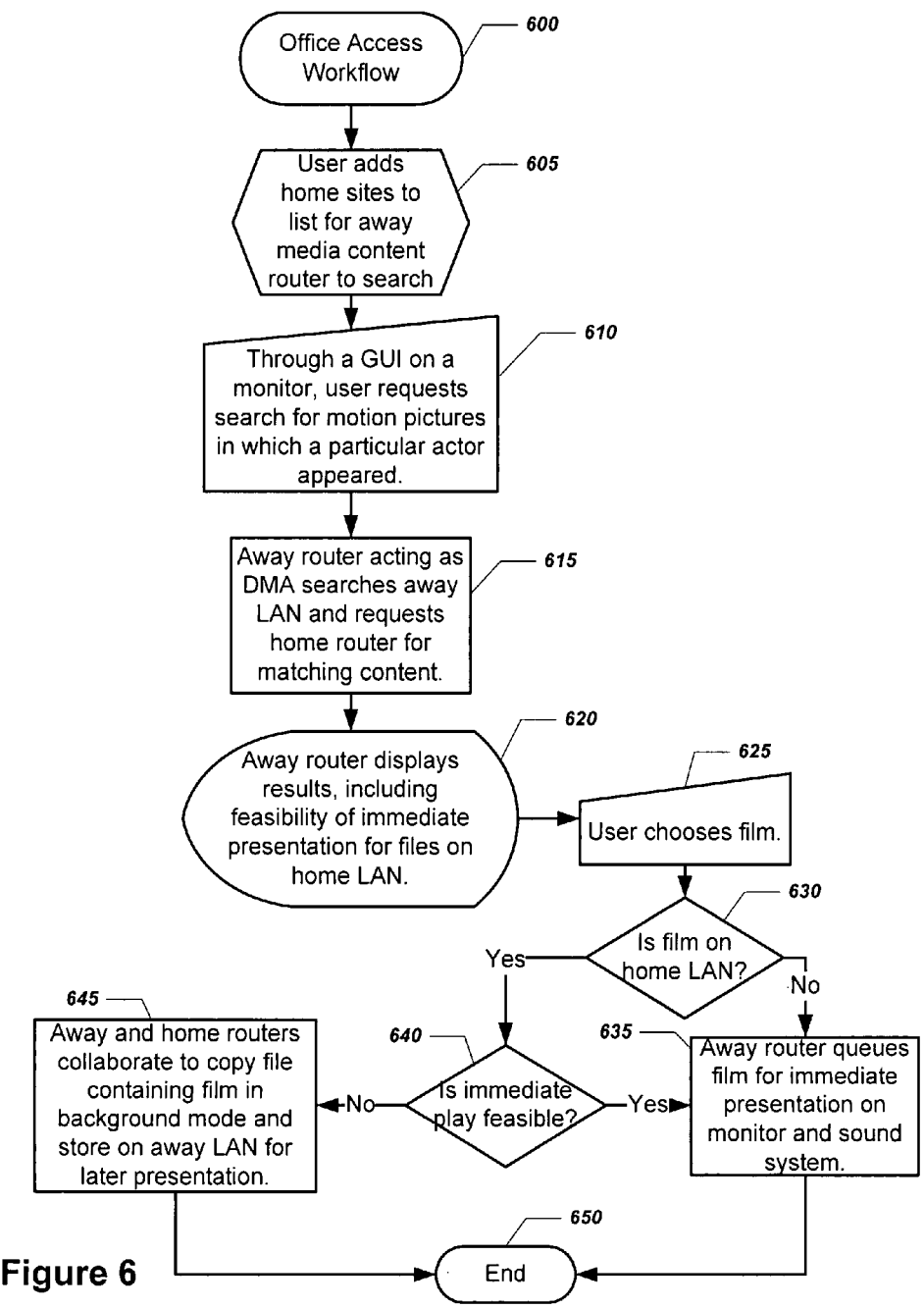
FIG. 6 is a flowchart showing a workflow for away access, storage, and presentation of home digital media content.

FIG. 6 depicts a workflow 600 for away presentation of digital media content 175 corresponding to the configurations of the home media management system 100 and the away media management system 301 shown in FIG. 3. In advance, the away user 370 must add 605 an address of the home media management system 100 to a list of locations where digital media content 175 can be found. Authentication of the away user 370 for accessing the home site and a check of authorization of the away user 370 to access the home content would optionally be done at this stage.

For purposes of illustration, we have chosen an embodiment of the invention in which the away media content router 306 plays the dual role of a router and a DMA 185 for the away LAN 326. As previously discussed, other roles for the away media content router 306 are possible. The away user 370 can therefore request through a GUI client of the away media content router 306 that digital media content 175 be cataloged, searched, or presented. The away media content router 306 covers content both in file servers 190 on the away LAN 326 and, using the home media content router 106 as an intermediary, on the home LAN 126. Here, as a typical case, the away user 370 request that film be played on the monitor.

After initialization, through a GUI shown on a monitor on the away LAN 326, the user requests 610 a search for motion pictures in which a particular actor appears. Alternatively (not shown), the away user 370 might request a catalog of all home digital media content 175 items or make some other DMA-like request through the GUI. The away media content router 306 acting as a DMA 185 searches 615 file servers 190 both on the away LAN 326 and, using the home media content router 106 as an intermediary, on the home LAN 126. The away media content router 306 displays 620 the results to the away user 370, who then chooses 625 a particular film. If 630 the film is on the away LAN 326, then the away media content router 306 queues 635 it for immediate presentation. Otherwise, the film resides on the home LAN 126. If 640 immediate play from the home LAN 126 is determined (either automatically by router logic or by away user 370 choice), then again the away media content router 306 queues 635 it for immediate presentation, in this case in collaboration with the home media content router 106. If presentation across the WAN 160 is not practical, then the away media content router 306 and the home media content router 106 collaborate to copy the digital file 180 containing the film in background mode to a file server 190 on the away LAN 326 for later presentation.

The present invention is not limited to all the above details, as modifications and variations may be made without departing from the intent or scope of the invention. Consequently, the invention should be limited only by the following claims and equivalent constructions.

What is claimed is:

1. A system for remote processing of digital files, comprising:
 a) a file server connected to a local area network (LAN) containing a designated folder in hardware storage, for digital files;
 b) a media content server containing trigger logic to notify a media content router when a file requiring processing is placed into the designated folder; and
 c) the media content router, which is an apparatus including hardware and containing:
  (i) router logic to manage the LAN and provide connectivity to a wide area network (WAN) for a digital device on the LAN;
  (ii) upload logic to transmit the file requiring processing across the WAN to a remote service facility upon receipt of the notification from the media content server; and
  (iii) catalog logic whereby,
   (A) upon receiving a search request, which specifies a search criterion, from a digital device connected to the LAN, the media content router transmits a list of digital media content items stored in file servers on the LAN that match the search criterion to the digital device; and
   (B) upon receiving a search request, which specifies a search criterion, from a digital device connected to the WAN, the media content router transmits a list of digital media content items stored in file servers on the LAN that match the search criterion to the digital device.

2. The system of claim 1, wherein the trigger logic causes notification of the media content router essentially immediately when a file requiring processing is placed into the designated folder.

3. The system of claim 1, wherein the upload logic causes the file to be transmitted without interaction with a user.

4. The system of claim 1, wherein the upload logic causes transmission to the remote service facility of files requiring processing to have lower priority than all other types of communications activities through the media content router.

5. The system of claim 1, the media content router further containing:
 (iv) search logic whereby, upon a request from a digital device connected to the LAN or the WAN specifying search criteria, the media content router finds and transmits a list of any digital media content items stored in file servers on the LAN satisfying the criteria to the digital device.

6. The system of claim 1, the media content router further containing:
 (iv) file transfer logic whereby, upon a request from a digital device connected to the LAN or to the WAN, said request specifying a digital media content item stored on the LAN and designating the address of a target device on the LAN or the WAN, the media content router transmits the specified item to the target device.

7. The system of claim 1, the media content router further containing:
 (v) graphical user interface (GUI) logic, whereby a user can interact with a GUI display on a monitor to cause the media content router to perform one or more of the following tasks:
  A. a catalog of all digital media content items stored in file servers on the LAN;
  B. a search of file servers on the LAN for all digital media content items satisfying a set of criteria specified by the user; and
  C. a presentation of a digital media content item on a target presentation device on the LAN or on the WAN.

8. The system of claim 1, wherein the search criterion is received through a user interface.

9. A media content router apparatus, comprising:
a) router logic to manage a local area network (LAN) and provide connectivity to a wide area network (WAN) for a digital device on the LAN;
b) upload logic to transmit a file across the WAN to a remote location upon receipt of notification from a media content server that a file requiring processing is placed into a designated folder on a file server connected to the LAN; and
c) catalog logic whereby,
  (i) upon receiving a search request, which specifies a search criterion, from a digital device connected to the LAN, the media content router transmits a list of digital media content items stored in file servers on the LAN that match the search criterion to the digital device; and
  (ii) upon receiving a search request, which specifies a search criterion, from a digital device connected to the WAN, the media content router transmits a list of digital media content items stored in file servers on the LAN that match the search criterion to the digital device;
wherein the media content router apparatus is a hardware device.

10. The media content router of claim 9, further comprising:
d) search logic whereby, upon a request from a digital device connected to the LAN or the WAN specifying search criteria, the media content router finds and transmits a list of any digital media content items stored in file servers on the LAN satisfying the criteria to the digital device.

11. The media content router of claim 9, further comprising:
d) file transfer logic whereby, upon a request from a digital device connected to the LAN or to the WAN, said request specifying a digital media content item stored on the LAN and designating the address of a target device on the LAN or the WAN, the media content router transmits the specified item to the target device.

12. The media content router of claim 9, further comprising:
d) graphical user interface (GUI) logic, whereby a user can interact with a GUI display on a monitor to cause the media content router to perform one or more of the following tasks:
  (i) a catalog of all digital media content items stored in file servers on the LAN;
  (ii) a search of file servers on the LAN for all digital media content items satisfying a set of criteria specified by the user; and
  (iii) a presentation of a digital media content item on a target presentation device on the LAN or on the WAN.

13. The media content router apparatus of claim 9, wherein the search criterion is received through a user interface.

* * * * *